May 21, 1968     C. S. PHELAN     3,384,142
SANDWICH PANEL INSERT, ROTATABLE SNAP-IN TYPE
Filed April 5, 1965
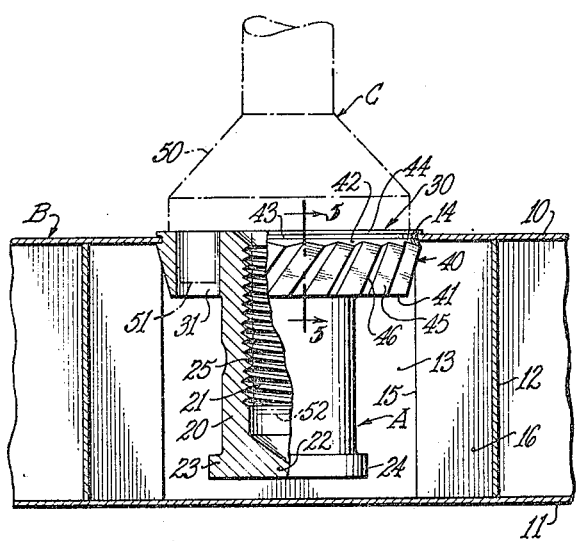
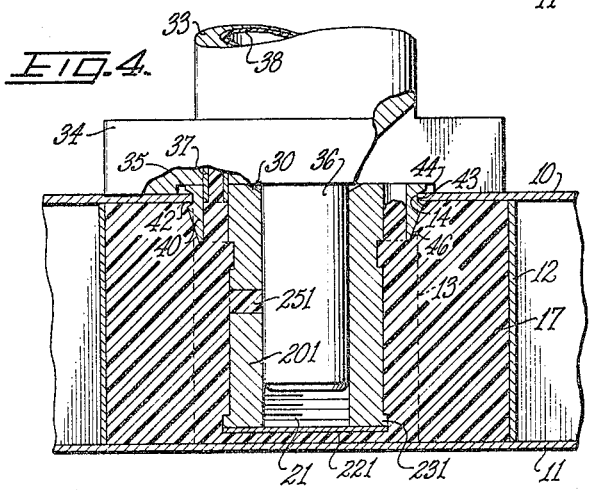
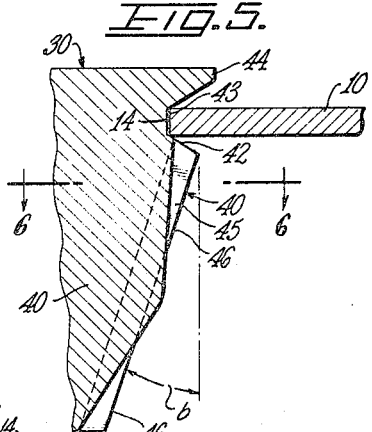
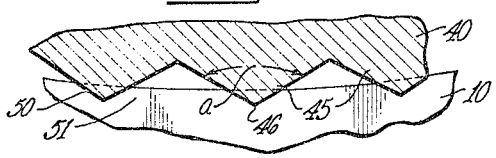
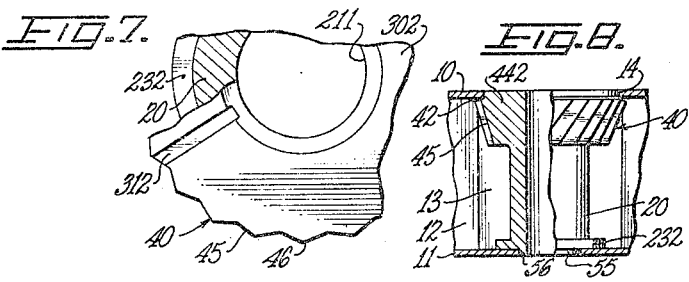
INVENTOR.
CHARLES S. PHELAN
BY Lynn H Latta
ATTORNEY United States Patent Office 3,384,142
Patented May 21, 1968

3,384,142
SANDWICH PANEL INSERT, ROTATABLE
SNAP-IN TYPE
Charles S. Phelan, Tustin, Calif., assignor to
Frederick W. Rohe, Placentia, Calif.
Filed Apr. 5, 1965, Ser. No. 445,416
11 Claims. (Cl. 151—41.73)

This invention relates to spacers for potted or molded-in installation in wall panels of lightweight, low density core sandwich panel construction, and in particular to an improved spacer which is generally of the type known as a snap-in insert, having a disc head provided with a snap-in groove to receive and anchor the insert to the edge of a skin-sheet aperture constituting the mouth of a hole in the panel in which the insert is installed with a body of compound surrounding and supporting the body of the insert.

In the past, inserts of this type have utilized a low-angle expander cone leading to the snap-in groove and terminating in a locking shoulder defining one side of the groove. Such inserts have been installed by straight axial pressure applied to the head of the insert to force the expander cone through a skin aperture of smaller diameter than the locking shoulder at the end of the expander cone. The fairly high pressure required to force the cone through the skin aperture has always involved the problem of damage to the panel tending to occur from pushing in the marginal area of the skin surrounding the entry aperture and partially crushing the thin-walled honeycomb core structure attached to the inner face of the skin. Efforts to overcome this problem by cutting away circumferentially spaced sections of the expander cone shoulder to reduce the resistance of the skin to passage of the cone therethrough, have not adequately solved the problem in a fully satisfactory manner.

The general object of the invention is to provide an insert of the snap-in type having an improved push-through expander cone construction which drastically reduces the amount of axial pressure required for passing the cone through the apertured skin, thereby rendering the installation procedure much easier than in the past; and which completely eliminates any possible damage to the panel resulting from forcing the expander cone through the skin. Toward the attainment of this general object, the invention provides a potting-in type sandwich panel insert:

(1) Having a head to fill a skin aperture constituting the mouth of an installation hole in the panel, said head being provided with a snap-in groove to receive and lock upon the edge of the skin forming the margin of said aperture, and having an expander cone provided with a plurality of diagonal lead flutes providing for greatly improved push-through coaction with the aperture margin of the skin.

(2) Wherein such lead flutes are of prism form, presenting notching edges adapted to readily penetrate the skin aperture margin under relatively light push-through pressure and to gradually expand said margin by notching the same in circumferentially limited areas so as to effect the passage of the expander cone through the skin without the necessity for stretching the sheet and without deforming it by any substantial pushing in or dimpling effect.

(3) Wherein the lead flutes commence at a diameter of the expander cone substantially smaller than the skin aperture diameter so that the smaller forward end of the cone is freely receivable in the aperture prior to engagement of the aperture margin by the flutes, and so that the notching of the aperture margin is developed gradually by engagement of the outer edges of the flutes against the margin, and the notches are gradually deepened as the larger diameter of the cone is pushed through the aperture.

(4) Wherein the lead flutes have a diagonal inclination such that, by applying torque to the head of the insert as the flutes commence to notch the aperture margin, the flutes will become intermeshed with the margin and will exert a camming effect thereagainst tending to draw the head through the aperture so as to further reduce the amount of axial pressure against the insert required for snapping the expander cone through the aperture.

(5) Wherein the inclination of the lead flutes is established within a range such as to attain an optimum combination of ease of starting the insert through the aperture and completing the snap-through installation with or without the use of excessive axial pressure.

(6) Wherein the insert head is provided with a pair of diametrically opposed ports functioning initially as sockets for coupling a spanner wrench to the insert for pressing and rotating the insert into its initially installed position, and which subsequently provide the additional function in which one of the ports serves to receive the nozzle of a potting compound injection gun for injection of compound through the insert head into the panel hole while the other port serves as a viewing port for determining when the hole has been filled.

Other objects and advantages will become apparent in the ensuing specification and appended drawing in which:

FIG. 1 is a fragmentary sectional view of a sandwich panel, shown on an enlarged scale, illustrating an insert embodying my invention, shown partially in elevation and partially in axial section, and further illustrating the initial stage of snap-in installation thereof preceding the potting-in step;

FIG. 2 is a plan view of the same;

FIG. 3 is a bottom plan view of the same;

FIG. 4 is an axial sectional view of an insert embodying a modified form of the invention, and illustrating the potting-in step of installation of the inserts of the invention;

FIG. 5 is a fragmentary sectional view of the expander flute structure, on an enlarged scale, taken on line 5—5 of FIG. 1;

FIG. 6 is a fragmentary transverse sectional view of the same, on an enlarged scale, in a plane normal to the insert axis, taken on line 6—6 of FIG. 5;

FIG. 7 is a fragmentary head-end view of another modified form of the insert; and FIG. 8 is a side elevational view of the same, as installed in a sandwich panel.

Referring now to the drawing in detail and in particular to FIG. 1, I have shown therein, as an example of one form in which the invention can be embodied, an insert A being installed in a sandwich panel B by means of a spanner wrench or equivalent tool C, shown in phantom. Sandwich panel B is of well-known lightweight construction comprising spaced skins 10 and 11 attached to opposite sides of a sandwich core 12 of honeycomb structure comprising extremely thin walls disposed in planes normal to the skin sheets 10 and 11 and having their opposite edges secured thereto. Preparatory to installation of the insert, a hole 13 is drilled through the core 12, commencing with a circular aperture 14 in the skin 10 and terminating at or close to the opposite skin 11. Normally the walls of core 12 are formed and attached to one another in a configuration such as to define a plurality of hexagonal cells, and in drilling through this honeycomb wall structure, the drilled diameter of the hole will be defined by a series of edges (indicated by the numeral 15) where the walls have been cut through, and a number of pockets 16, radiating outwardly from the drilled diameter, will be defined by the remnant wall portions adjacent the drilled diameter and will extend back beneath the annular marginal portion of skin 10 around aperture 14. The hole 13, including the irregularly radiating pockets 16, is filled with a body of potting compound which, when hardened, is locked into the panel by the radially projecting portions thereof in the pockets 16, engaged beneath the aperture margin of skin 10. The anchoring body of potting compound is injected into the hole 13 after the preliminary installation shown in FIG. 1, and may be the same as the anchoring body shown at 17 in FIG. 4.

Insert A comprises a tubular body 20 having a bore which can be a smooth cylindrical through bore for reception of a bolt extended through the panel where the insert is in the form of a spacer (FIG. 8) having its respective ends engaged with respective skins and with aligned apertures in both skins in accordance with well-known spacer construction; or in the alternative can be in the form of an internally threaded socket 21 to receive a threaded fastener stud screwed into the insert after its installation, and with a closed end 22 at the bottom of such socket. At this end of the insert, it is provided with a relatively small head 23 of non-circular peripheral contour for torque-anchorage in the body of potting compound 17. In accordance with common practice, the head 23 may be formed by cutting away the sides of a circular flange of smaller diameter than aperture 14, leaving side flats 24 for torque-anchorage, in which event the head in effect consists of a pair of diametrically opposed radially projecting wings. The outer surface of tubular body 20 may be smoothly cylindrical as shown, or may optionally be roughened to provide additional torque-anchorage. The internally threaded portion of the tubular body 20 is preferably provided with a thread-lock which can consist of an inwardly deformed section 25 having threads of contracted diameter extending partially or entirely around the body 20, or can embody a plug of plastic material (e.g. nylon) shown at 251 in FIG. 4, installed with a press-fit in a radial bore in the tubular wall 201 of that insert.

At its outer end the insert is provided with a relatively large head 30 having a pair of diametrically opposed axial ports 31 and 32 extending therethrough, the inner sides of these ports being adjacent the outer diameter of tubular body 20. One of these ports (e.g. 31) is adapted to be used as an injection port for the injection of potting compound therethrough after the insert has been initially installed as in FIG. 1, and the other port (e.g. 32) is then used as an inspection port which is viewed to determine the point where the hole 13 has been satisfactorily filled with potting compound. The filling operation, in the installation of each form of insert, is similar to that disclosed in FIG. 4, and may utilize the installation tool disclosed in the pending application of myself and F. W. Rohe Ser. No. 332,437, filed Dec. 23, 1963, now Patent No. 3,217,363 comprising a barrel 33 forming part of an injection gun, having at its forward end an anvil 34 provided with a flat forward face adapted for locating engagement against the skin 10 and with a shallow annular recess 35 in which the insert head 30 is adapted to seat, having a cylindrical pilot 36 of slightly yieldable plastic material (e.g. nylon) adapted to snugly pilot in the threaded insert bore 21 for holding the insert on the tool during insertion in hole 13, and having a short nozzle 37 of thin, yieldable wall structure adapted to be received and sealed in the injection port 31 of the insert head when the insert is properly mounted on the pilot 36. The nozzle 37 can constitute an integral extension of a thin flexible plastic liner 38 fitted within the barrel 33 and holding a body of plastic material which is extruded through the nozzle 37 under pressure applied by suitable means embodied in the applicator gun.

The present invention provides, in head 30, an improved means for installation and temporary anchorage of the insert in the panel B pending hardening of the potting compound 17. Such means comprises a deep expander cone 40 on the periphery of head 30, extending from a leading end (commencing at a radial shoulder 41) having a diameter considerably smaller than that of skin aperture 14 so as to be receivable therein freely with a piloting action, and terminating in a shoulder 42 (FIG. 5) which defines one side of an annular snap-in groove 43 adjacent the outer face of the head, the opposite side of the groove being defined by a thin, overhanging annular lip 44 which has overlapping engagement with the skin aperture margin to seat the insert with its axis normal to the skin. The expander cone 40 has a generally conical periphery defined by a series of diagonal flutes 45 of shallow triangular cross section, each having a crest edge 46 adapted to operate with an indenting or grooving action in the skin aperture margin in response to combined axial pressure and rotary torque applied to the insert during installation.

FIG. 6 shows one of the flutes 45 in enlarged cross section, which, in essence is that of an isosceles triangle having an obtuse apex angle $a$ defined between its flat sides. The angle $a$ may have an optimum value of approximately 120° and may range between a maximum value of approximately 135° and approximately 90° minimum. The broad base of the triangular cross section may extend circumferentially approximately 1/30 of a circumference or about 12 arcuate degrees, and the total number of flutes may range from approximately 25 to 35, with an optimum of about 30 flutes. The shoulder 42 will be seen (FIG. 1) to be composed of a circumferential succession of shallow triangular faces with adjoining lateral corners.

The crest edges 46 cooperatively define a frusto-conical periphery having a conical inclination indicated as the angle $b$ in FIG. 5 which is approximately 15 degrees and may range between approximately 10° minimum and 20° maximum with an optimum of about 18°.

As illustrated in FIG. 4, the bore 21 may extend entirely through the tubular body 201 and may be closed at the blind end of the insert by a thin plate or shim 221 sweated or otherwise suitably secured to the end face of laterally flatted head 231; but except as herein specified, this insert may be identical to the insert of FIGS. 1 and 2 described above, and the installation procedure may be identical.

The invention further contemplates that for some installations the head 302 (FIGS. 7, 8) may be imperforate (without the ports 31, 32) and provided with shallow radial wrenching grooves 312 for reception of screwdriver edges on a spanner wrench. The insert of FIGS. 7, 8 may be utilized in the form of a spacer with its smaller head 232 in a form of a plain annular flange engaged against the skin 11 and with a plain through bore 211 for a through bolt, and the use of potting compound may in such case ordinarily be dispensed with. The flutes 45 as seen in FIG. 7 may be identical with those of FIGS. 1–4. The annular lip 44 of FIGS. 1–5 may be omitted in this insert, and in lieu of the annular groove 43, the head 302 may simply have a cylindrical shoulder defined as the periphery of a pilot 442 which is snugly receivable in opening 14 when the expander cone 40 has been forced through the opening. Head 232 may likewise have an annular pilot 55 engaged in an aperture 56 in skin sheet 11. Shoulder 42 will be secured in its engagement against skin sheet 10, and will hold head 232 snugly seated against skin sheet 11. Vice versa, the engagement of head 232 against skin sheet 11 will be effective to hold pilot 442 in opening 14.

In the installation of the insert, a spanner wrench C having a head 50 provided with axially projecting jaws 51 for engagement in the ports 31 and 32, may be utilized, with the head 50 applying axial pressure to the insert head 30 while being rotated to apply torque thereto. The tool C may also include a smooth cylindrical pilot 52 adapted to fit snugly into the insert bore 21 so as to attach the insert to the tool. To commence the installation procedure, the insert is inserted through the skin aperture 14 into the hole 13 and the expander cone 40 is inserted freely into the aperture 14 until the crest edges 46 of the flutes 45 establish contact with the skin aperture margin. Nominal axial pressure and rotative torque are then applied causing the edges 46 to indent the skin aperture margin and thus permitting the flutes 45 to be advanced into the aperture 14. As the edges 46 bite into the skin aperture margin, indenting the same so as to develop notches 50 and intervening teeth 51 therein, the applied torque may gradually be increased without increasing the axial pressure, and the flutes 45, having established meshing engagement with the skin aperture margin, will develop a camming effect tending to draw the head through the aperture in response to the applied torque, and this camming effect will gradually increase as the head advances deeper into the aperture and as additional torque is gradually applied, while the axial pressure may be kept at substantially the initial low value or even decreased, until finally the larger end of the head 30 will have cammed its way through the aperture and the triangular ends of the flutes, collectively constituting the shoulder 42, will lock against the inward edge of the aperture margin. As the flutes 45 snap free from meshing engagement with the aperture margin, the applied torque will automatically cause some additional rotation of the head 30 which will in most instances displace the shouldered ends of the flutes with reference to the indentations in the skin aperture margin through which the flutes have been threaded, thus providing adequate locking of the shoulder 42 against the aperture margin. The cross-sectional proportions of the flutes 45 hereinbefore described will provide an optimum combination of satisfactory grooving of the aperture margin by the crest edges 46 of the flutes during installation, and sufficient circumferential width in the triangular terminal ends of flutes 45 in shoulder 42, to provide satisfactory shoulder-locking of the insert head to the skin 10.

The anchorage of the insert in the panel thus obtained will be adequate to hold it in proper position while potting compound is injected through injection port 31 and the filling observed through inspection port 32 as previously described. In the finally installed insert, after the body of potting compound 17 has hardened, the flat side faces 24 of the blind head 23, together with the flutes 45, will be torque-anchored in the potting body 17 sufficiently for adequate torque-holding against the threading of a stud into the bore 21 for attaching the panel to another member (e.g. a structural stud or rib of an airplane fuselage). At the same time the projecting wings of head 23 will cooperate with the locking of shoulder 42 against the skin aperture margin to resist any pulling of the insert out of the hole 13.

An optimum angle of approximately 45 degrees of helical inclination of flutes 46 provides the most satisfactory combination of low axial pressure and camming effect for maximum ease of projecting the head 30 through the skin aperture 14. Satisfactory results can be obtained where the helical inclination is within the range of 30 degrees to 60 degrees with reference to a transverse normal plane of head 40 (e.g. the plane of shoulder 41). Outside these limits, an angle of much less than 30 degrees is found to develop too much axial pressure against the skin 10 and to increase the difficulty of establishing an indented meshing engagement between the flutes and the skin aperture margin, there being a tendency to ream the aperture with a wedging effect of the forward faces of flutes 45 against the aperture margin, whereas the angle is greater than 60 degrees, the camming effect tending to draw the head 30 through the aperture in response to applied torque, is reduced to an unsatisfactorily low value and in order to force the head 30 through the aperture, reliance must be placed principally upon the axial push against the insert head.

I claim:

1. An insert fastener for installation in a lightweight sandwich panel embodying spaced skins attached to opposite sides of a low-density core, having a hole extending through one of said skins and through said core, said hole beginning with an opening in said one skin sheet, said fastener comprising, in combination: a tubular body and an integral, radially enlarged head at one end thereof, said insert having a fastener element receiving bore extending through said head and into said body; said head having a plurality of helical flutes collectively defining a frusto-conical periphery operable as a screw-feed expander cone for forcible passage through said opening, said cone having a smaller end of less diameter than said opening, for free entry therein, the ends of said flutes at said larger end collectively defining an annular shoulder having an outer diameter greater than the diameter of said opening, for engagement against the inner side of said one skin at the margin of said opening; said flutes having helical crests adapted to penetrate said margin in response to axial pressure applied to said head, so as to develop in said margin a plurality of notches and intervening teeth intermeshing with said flutes so as to develop between said cone and said one skin sheet, in response to a combination of axial pressure and rotative torque applied to said head, a camming action facilitating the passage of said cone through said opening with a minimum of axial pressure such as to avoid compressive damage to said panel; said flutes being helically pitched at an angle of between 30 degrees and 60 degrees to a circumference of said cone periphery.

2. A fastener as defined in claim 1, wherein said flutes are of triangular cross section, having lateral faces intersecting to define dihedral angular edges constituting said crests.

3. A fastener as defined in claim 1, wherein said flutes are pitched at an optimum angle of approximately 45 degrees.

4. An insert fastener as defined in claim 1 wherein said expander cone periphery subtends an angle in the approximate range between 10 and 20 degrees at the axis of the insert.

5. An insert fastener as defined in claim 1, wherein said cone periphery subtends an angle at the axis of the fastener having an optimum of approximately 18 degrees.

6. An insert fastener as defined in claim 1, wherein said tubular body is in the form of an internally threaded socket having a closed bottom, for reception of a threaded fastener element.

7. An insert fastener as defined in claim 1, wherein said cone periphery subtends an angle at the axis of the fastener having an optimum of approximately 18 degrees and wherein said tubular body has, at its closed end, a non-circular head for torque-load-holding anchorage in a body of potting material within said panel hole.

8. An insert fastener as defined in claim 1, wherein said bore is a through bore to receive a bolt extending through both of said skins and through said tubular body and wherein said tubular body is of a length to extend the full distance between said skins and has an open inner end for abutting engagement against the other skin of said panel.

9. An insert fastener as defined in claim 1, wherein said head has a thin annular lip in axially opposed, spaced relation to said shoulder and defining therewith an annular groove adapted to receive said margin of said one skin.

10. An insert fastener as defined in claim 1, wherein said head has a shallow annular pilot projecting axially from said shoulder and receivable in said opening of said one skin, and wherein said tubular body has an open opposite end positioned for abutting engagement against the other skin.

11. An insert fastener as defined in claim 1, wherein said tubular body has an open opposite end positioned for abutting engagement against the other skin and has a thin annular pilot projecting beyond said opposite end for engagement in an aperture in said other skin.

References Cited

UNITED STATES PATENTS

| | | | |
|---|---|---|---|
| 2,136,523 | 11/1938 | Rosenberg | 151—41.73 |
| 3,042,156 | 7/1962 | Rohe | 52—617 |
| 3,016,578 | 1/1962 | Rohe | 151—41.7 |
| 3,197,854 | 8/1965 | Rohe et al. | 151—41.73 |

FOREIGN PATENTS

| | | |
|---|---|---|
| 812,540 | 4/1959 | Great Britain. |
| 1,091,566 | 10/1954 | France. |
| 500,583 | 3/1959 | Canada. |

CARL W. TOMLIN, *Primary Examiner.*

EDWARD C. ALLEN, *Examiner.*

R. S. BRITTS, *Assistant Examiner.*